United States Patent
Cheng et al.

(10) Patent No.: US 9,897,084 B2
(45) Date of Patent: Feb. 20, 2018

(54) SENSORLESS ADAPTIVE PUMP CONTROL WITH SELF-CALIBRATION APPARATUS FOR HYDRONIC PUMPING SYSTEM

(71) Applicant: Fluid Handling LLC., Morton Grove, IL (US)

(72) Inventors: Andrew A. Cheng, Wilmette, IL (US); James J. Gu, Buffalo Grove, IL (US); Graham A. Scott, Prospect Heights, IL (US)

(73) Assignee: Fluid Handling LLC, Morton Grove, IL (US)

( * ) Notice: Subject to any disclaimer, the term of this patent is extended or adjusted under 35 U.S.C. 154(b) by 458 days.

(21) Appl. No.: 14/339,594

(22) Filed: Jul. 24, 2014

(65) Prior Publication Data

US 2015/0032271 A1 Jan. 29, 2015

Related U.S. Application Data

(60) Provisional application No. 61/858,237, filed on Jul. 25, 2013.

(51) Int. Cl.
| | |
|---|---|
| G06F 19/00 | (2011.01) |
| F04B 49/06 | (2006.01) |
| G05D 7/06 | (2006.01) |
| F04D 15/00 | (2006.01) |

(52) U.S. Cl.
CPC ........ F04B 49/065 (2013.01); F04D 15/0066 (2013.01); G05D 7/0676 (2013.01)

(58) Field of Classification Search
CPC ............................ F04B 49/065; G05D 7/0676
See application file for complete search history.

(56) References Cited

U.S. PATENT DOCUMENTS

| | | | |
|---|---|---|---|
| 5,222,867 | A | 6/1993 | Walker, Sr. et al. |
| 6,374,191 | B1 | 4/2002 | Tsuchiya et al. |
| 6,468,042 | B2 | 10/2002 | Moller |

(Continued)

FOREIGN PATENT DOCUMENTS

| | | |
|---|---|---|
| CN | 101374443 A | 2/2009 |
| CN | 103206388 A | 7/2013 |

(Continued)

OTHER PUBLICATIONS

JP2008193877 English Language Abstract (1 page).

(Continued)

*Primary Examiner* — Michael D Masinick
(74) *Attorney, Agent, or Firm* — Ware, Fressola, Maguire & Barber LLP

(57) ABSTRACT

The present invention provides apparatus that features a signal processor or processing module configured to receive signaling containing information about an adaptive or self-calibrating set point control curve and a varying equivalent system characteristic curve based at least partly on an instant pump pressure and a flow rate using an adaptive moving average filter, and equivalent hydronic system characteristics associated with the instant pump pressure and the flow rate to corresponding motor power and speed reconstructed and remapped using a discrete numerical approach; and determine an adaptive pressure set point, based at least partly on the signaling received.

10 Claims, 4 Drawing Sheets

3D discrete distribution function of motor power (HP) with respect to motor speed (Hz) and equivalent system characteristics ($C_v$), respectively.

(56) References Cited

U.S. PATENT DOCUMENTS

| | | |
|---|---|---|
| 6,948,508 B2 | 9/2005 | Shajii et al. |
| 7,009,432 B2 | 3/2006 | Beghein |
| 7,668,694 B2 | 2/2010 | Anderson et al. |
| 7,798,781 B2 | 9/2010 | Parsons et al. |
| 8,079,825 B2 | 12/2011 | Bocchiola |
| 8,406,932 B2 | 3/2013 | Hollaway |
| 8,425,200 B2 | 4/2013 | Tran et al. |
| 8,441,222 B2 | 5/2013 | Manzarek et al. |
| 8,700,221 B2 | 4/2014 | Cheng et al. |
| 2004/0186648 A1 | 9/2004 | Zheng et al. |
| 2005/0039904 A1 | 2/2005 | Aler et al. |
| 2006/0237063 A1 | 10/2006 | Ding et al. |
| 2007/0150113 A1 | 6/2007 | Wang et al. |
| 2009/0093774 A1 | 4/2009 | Wang et al. |
| 2012/0022839 A1* | 1/2012 | Valicek .............. B24C 1/045 703/2 |
| 2012/0173027 A1* | 7/2012 | Cheng ............... F04D 15/0088 700/282 |
| 2014/0005841 A1* | 1/2014 | Cheng ................ G05D 7/0617 700/282 |
| 2014/0249682 A1* | 9/2014 | Cheng ............... F04D 27/001 700/282 |
| 2014/0288716 A1* | 9/2014 | Cheng ............... F04D 15/0088 700/282 |
| 2015/0032271 A1* | 1/2015 | Cheng ................ G05D 7/0676 700/282 |
| 2016/0010639 A1* | 1/2016 | Cheng ................... F04B 51/00 73/168 |
| 2016/0017889 A1* | 1/2016 | Cheng ............... F04D 15/0072 700/277 |

FOREIGN PATENT DOCUMENTS

| | | |
|---|---|---|
| EP | 0978657 | 2/2000 |
| EP | 2362164 | 8/2011 |
| JP | 2008193877 | 8/2008 |
| JP | 2008245353 | 9/2008 |
| KR | 20110097203 | 8/2011 |
| WO | 2005064167 | 7/2005 |
| WO | 2013090907 | 6/2013 |

OTHER PUBLICATIONS

JP2008245353 English Language Abstract (1 page).
KR20110097203 English Language Abstract not available, see corresponding EP2362164.
WO2005064167 English Language Abstract (1 page).
CN101374443A English Language Abstract.
CN103206388A English Language Abstract.

* cited by examiner

Figure 1A: A pumping control system with any unknown or dynamic hydronic distribution system.

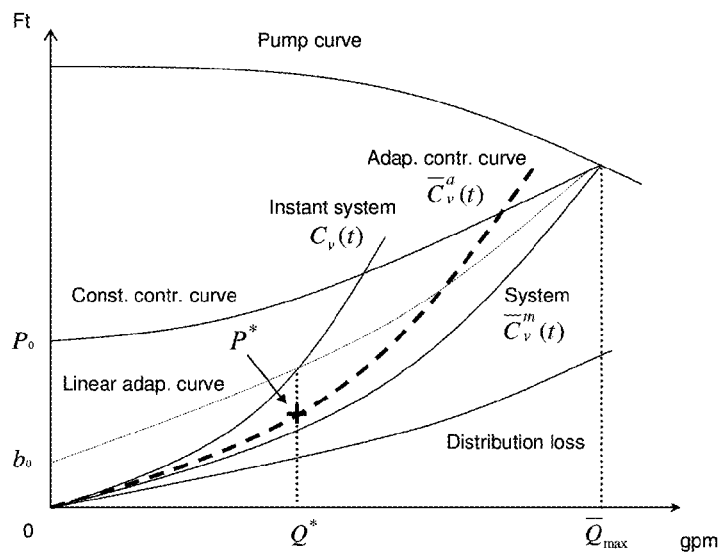
Figure 2. The adaptive pressure set point $P^*$ calculated with respect to the requested flow $Q^*$ based upon the adaptive linear control curve as well as system curves.

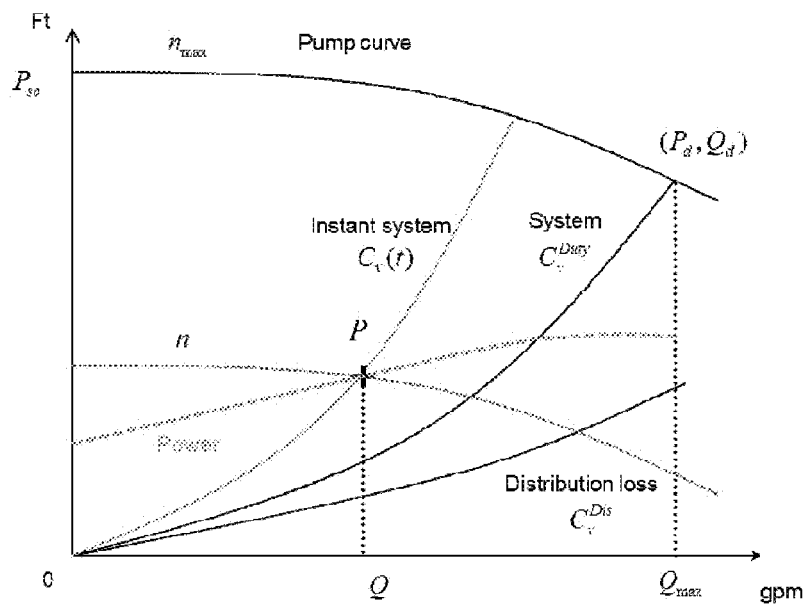
Figure 3. Pump, system and power characteristics curves and the steady state pressure equilibrium point.
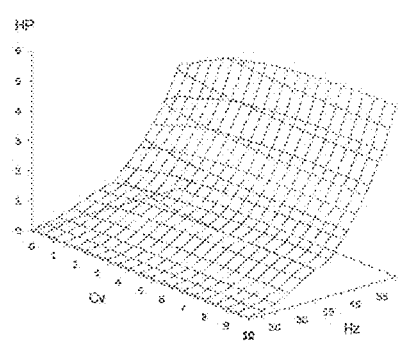
Fig. 4. 3D discrete distribution function of motor power (HP) with respect to motor speed (Hz) and equivalent system characteristics ($C_v$), respectively.

Apparatus 10

Signal processor or processing module 10a configured at least to:

receive signaling containing information about an adaptive or self-calibrating set point control curve and a varying equivalent system characteristic curve based at least partly on an instant pump pressure and a flow rate using an adaptive moving average filter, and equivalent hydronic system characteristics associated with the instant pump pressure and the flow rate to corresponding motor power and speed reconstructed and remapped using a discrete numerical approach; and determine an adaptive pressure set point, based at least partly on the signaling received; and/or provide corresponding signaling containing information about the adaptive pressure set point determined.

Other signal processor circuits or components 10b that do not form part of the underlying invention, e.g., including input/output modules, one or more memory modules, data, address and control busing architecture, etc.

Figure 5

SENSORLESS ADAPTIVE PUMP CONTROL WITH SELF-CALIBRATION APPARATUS FOR HYDRONIC PUMPING SYSTEM

CROSS REFERENCE TO RELATED APPLICATION

This application claims benefit to U.S. provisional application No. 61/858,237, filed 25 Jul. 2013, entitled "Sensorless adaptive pump control with self-calibration apparatus for hydronic pumping system;" which is hereby incorporated by reference in its entirety.

This application is also related to a family of technologies developed by one or more of the inventors and disclosed in the following applications:

1) U.S. application Ser. No. 12/982,286, filed 30 Dec. 2010, entitled "Method and apparatus for pump control using varying equivalent system characteristic curve, AKA an adaptive control curve," which issued as U.S. Pat. No. 8,700,221 on 15 Apr. 2014;
2) U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011;
3) U.S. application Ser. No. 14/091,795, filed 27 Nov. 2013, entitled "3D sensorless conversion method and apparatus," which claims benefit to U.S. provisional application No. 61/771,375, filed 1 Mar. 2013;
4) U.S. application Ser. No. 14/187,817, filed 24 Feb. 2014, entitled "A Mixed Theoretical And Discrete Sensorless Converter For Pump Differential Pressure And Flow Monitoring," which claims benefit to U.S. provisional application No. 61/803,258, filed 19 Mar. 2013;
5) U.S. provisional application Ser. No. 61/976,749, filed 8 Apr. 2014, entitled "A Best-fit and Affinity. Sensorless Converter for Pump Differential Pressure and Flow Monitoring;" and
6) U.S. provisional application Ser. No. 62/007,474, filed 4 Jun. 2014, entitled "System and Flow Adaptive Pumping Control Apparatus—A Minimum Pumping Energy Operation Control System vs. Sensorless Application;"

which are all assigned to the assignee of the instant patent application, and all incorporated by reference in their entirety.

The present invention builds on the family of technologies disclosed in the aforementioned related applications.

BACKGROUND OF THE INVENTION

1. Field of the Invention

The present invention relates to a technique for controlling the operation of a pump; and more particularly, the present invention relates to a method and apparatus for controlling and/or monitoring a pump, e.g., including for domestic and commercial heating or cooling water systems.

2. Brief Description of Related Art

INTRODUCTION

By way of example, FIG. 1A shows a secondary variable speed pump control hydronic heating and cooling system that is known in the art, and FIG. 1B shows a water booster pumping system that is also known in the art. Recently, issues regarding energy saving and environmental protection in such pumping systems have been addressed dramatically. Increasingly more attention is being paid to hydronic pump control applications, including pump controls for domestic and commercial heating and cooling water pumping or circulating systems, water booster pumping systems, and so forth, like those shown in FIGS. 1A and 1B with their characteristics that may be dynamic and unknown in nature. To reduce energy consumption and operation costs, some known adaptive control approaches have been proposed.

In previous works by the inventors for a hydronics pumping system with flow rate regulated by control valves, e.g., like that shown in FIG. 1, an adaptive pumping control was developed by utilizing a linear adaptive control curve together with an equivalent system characteristics curve approach. For example, see that disclosed in U.S. Pat. No. 8,700,221; as well as the aforementioned application Ser. No. 13/717,086. Based upon that, an adaptive pressure set point can be obtained when there is a flow presented in the system and the pump speed may be adjusted accordingly by a PID (proportional/integral/derivative) controller, e.g., to make the system pressure rebalanced at the adaptive pressure set point or at the new pressure equilibrium point on the adaptive control curve intersected with the equivalent system characteristics curve. Following this approach, a flow meter as well as a pressure sensor may be needed in order to obtain the equivalent system characteristics curve.

Some sensorless converters have been developed to obtain the system flow and pressure associated with any unknown hydronic pumping system. For example, see that disclosed in the aforementioned U.S. application Ser. No. 14/091,795; U.S. application Ser. No. 14/187,817; as well as U.S. provisional application Ser. No. 61/976,749. With the sensorless approach, the system pressure and flow rate can be resolved directly from any pair of motor readout signals, such as speed, current, torque, power, etc., with higher accuracy.

SUMMARY OF THE INVENTION

The instant application provides a technique that is a further development of, and builds on, the aforementioned family of technologies.

In summary, according to the present invention, a sensorless adaptive hydronic pumping control technique or means which integrates the adaptive pump control with a sensorless convertor technique or means is provided to realize the adaptive pump control for a dynamic hydronics system without a need for a flow meter and a pressure sensor. Based upon that, a self-calibration scheme is also provided as well to recalibrate the sensorless adaptive pumping control system automatically. The sensorless adaptive pump control with the self-calibration configuration may be used for a dynamic hydronic system to save pump operation energy and reduce maintenance cost.

PARTICULAR EMBODIMENTS

According to some embodiments, the present invention may include, or take the form of, apparatus featuring a signal processor or processing module configured at least to:
   receive signaling containing information about an adaptive or self-calibrating set point control curve and a varying equivalent system characteristic curve based at least partly on an instant pump pressure and a flow rate using an adaptive moving average filter, and equivalent hydronic system characteristics associated with the instant pump pressure and the flow rate to corresponding motor power and speed reconstructed and remapped using a discrete numerical approach; and determine an adaptive pressure set point, based at least partly on the signaling received.

Embodiments of the present invention may also include one or more of the following features:

The signal processor or processing module may be configured to provide corresponding signaling containing information about the adaptive pressure set point determined, including a system pumping flow rate and pressure.

The corresponding signaling may contain information used to control a pumping hydronic system, including where the apparatus includes, or takes the form of, the pumping hydronic system.

The signal processor or processing module may be configured to: receive associated signaling containing information about the instant pressure and the flow rate of fluid being pumped in a pumping system; and determine the adaptive or self-calibrating set point control curve and the varying equivalent system characteristic curve, based at least partly on the associated signaling received. The associated signaling may be received from suitable sensors configured to measure the instant pressure and the flow rate of fluid being pumped in the pumping system. By way of example, the determined adaptive or self-calibrating set point control curve and varying equivalent system characteristic curve may be stored, e.g., in suitable memory or memory modules by the signal processor or processing module for subsequent signal processing.

The signal processor or processing module may be configured to: receive associated signaling containing information about an equilibrium point of pump differential pressure and system pressure formulated in a hydronic domain by utilizing pump and system characteristic curve equations so as to yield system pressure and flow at any particular load and time in a pump hydronic system; and determine the equivalent hydronic system characteristics associated with the pump pressure and flow rate to their corresponding motor power and speed reconstructed and remapped using the discrete numerical approach.

By way of example, the signal processor or processing module may include, or take the form of, at least one processor and at least one memory including computer program code, and the at least one memory and computer program code are configured to, with at least one processor, to cause the signal processor or processing module at least to receive the signaling (or, for example, associated signaling) and determine the adaptive pressure set point. The signal processor or processing module may be configured to suitable computer program code in order to implement suitable signal processing algorithms and/or functionality, consistent with that set forth herein.

The apparatus may include, or take the form of, a pump control or controller, including a PID control, having the signal processor or signal processor module, e.g., including for monitoring pump differential pressure and flow.

According to some embodiments, the present invention may take the form of a method including steps for: receiving in a signal processor or processing module signaling containing information about an adaptive or self-calibrating set point control curve and a varying equivalent system characteristic curve based at least partly on an instant pump pressure and a flow rate using an adaptive moving average filter, and equivalent hydronic system characteristics associated with the instant pump pressure and the flow rate to their corresponding motor power and speed reconstructed and remapped using a discrete numerical approach; and determining in the signal processor or processing module an adaptive pressure set point, based at least partly on the signaling received.

The method may include providing from the signal processor or processing module corresponding signaling containing information about the adaptive pressure set point determined, including where the corresponding signaling contains information used to control the pumping hydronic system.

The present invention may also, e. g., take the form of a computer program product having a computer readable medium with a computer executable code embedded therein for implementing the method, e.g., when run on a signaling processing device that forms part of such a pump controller. By way of example, the computer program product may, e. g., take the form of a CD, a floppy disk, a memory stick, a memory card, as well as other types or kind of memory devices that may store such a computer executable code on such a computer readable medium either now known or later developed in the future.

BRIEF DESCRIPTION OF THE DRAWING

The drawing includes the following Figures, which are not necessarily drawn to scale:

FIG. 1 includes FIGS. 1A and 1B, where FIG. 1A is a diagram of a pump control system with a dynamic hydronic distribution system that is known in the art; and where

FIG. 2 is a graph of flow rate Q (gpm) versus pressure P (Ft or psi), showing an adaptive pressure set point P* calculated with respect to the requested flow Q* based upon the adaptive linear control curve as well as system curves.

FIG. 3 is a graph of flow rate Q (gpm) versus pressure P (Ft or psi) showing pump, system and power characteristics curves and the steady state pressure equilibrium point.

FIG. 4 is a graph of a 3D discrete distribution function of motor power (HP) with respect to motor speed (Hz) and equivalent system characteristics ($C_v$), respectively.

FIG. 5 is a block diagram of apparatus, e.g., having a signal processor or processing module configured for implementing the signal processing functionality, according to some embodiments of the present invention.

DETAILED DESCRIPTION OF THE INVENTION

The present invention provides an integrated pump control technique or means that uses an adaptive pumping control with a sensorless convertor, to formulate a sensorless adaptive pumping control system, technique or means for a hydronics pumping system without a need of a flow meter and a pressure sensor. Subsequently, a self-calibration scheme for the sensorless adaptive pumping control system may be provided as well to make the control system recalibrated automatically if there is a need. The self-calibration sensorless adaptive pump control technique or means may therefore be achieved for any unknown hydronic pumping system to save pump operation energy and to reduce maintenance cost.

A Sensorless Adaptive Pumping Control

Figure 1B:
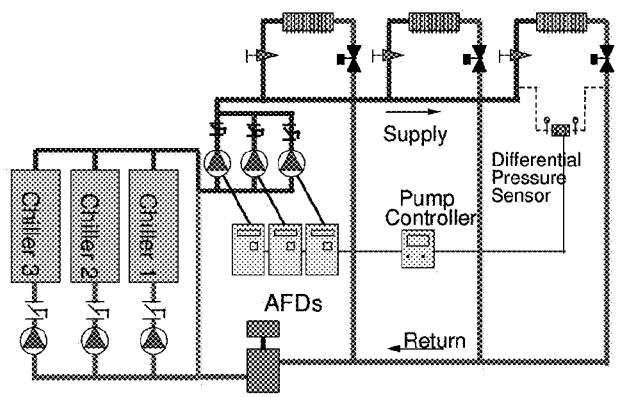
FIG. 1B is a diagram of a water booster pumping system that is known in the art.

By way of example, a linear adaptive pumping control system for an unknown hydronics pumping system with flow rate regulated by control valves is shown schematically in FIGS. 1A and 2. In the control, the adaptive pressure set point P* with respect to the system flow rate Q* requested by the system control valves is calculated specifically based upon a linear adaptive control curve and the system curve accordingly, consistent with that set forth and disclosed in U.S. Pat. No. 8,700,221; as well as the aforementioned application Ser. No. 13/717,086, as follows:

$$P^*(t) = (Q^*(t)/\overline{C}_v^a(t))^2, \quad (1)$$

where the requested flow rate, Q*(t), can be written as $$Q^*(t) = \qquad (2)$$
$$(1-r)C_v^2(t)/\overline{C}_v^m(t)\left(1 + \sqrt{1 + 4r(C_v(t)/\overline{C}_v^m(t))^2/(1-r)^2}\right)\sqrt{P_0}/2,$$

where $r = b_0/P_0$ is the ratio of a pressure offset of $b_0$ and the constant pressure set point of $P_0$, $C_v(t)$ is the instant system curve, $\overline{Q}_{max}$ is the adaptive maximum flow, and $\overline{C}_v^m(t)$ is the corresponding maximum system curve. Preferably, $\overline{Q}_{max}$ or $\overline{C}_v^m(t)$ may be obtained by using a moving peak detector. $\overline{C}_v^a(t) = MA(Q(t)/\sqrt{P(t)})$ is the adaptive control curve obtained from a moving average filter applied upon the flow equation of $C_v(r) = (Q(t)/\sqrt{P(t)})$.

An alternative approach of the adaptive pressure set point P* can also be obtained directly from the linear control curve together with the requested flow rate in Eq. 2 as $$P^*(t) = (Q^*(t)/\overline{Q}_{max}(t))^\alpha (P_0 - b_0) + b_0, \quad (3)$$

where α is a control curve setting parameter defined as a linear control curve with α=1 and a quadratic one with α=2, respectively.

Eqs. 1 or 3 can be used to calculate the adaptive pressure set point of P*, whenever there may be flow presented in the system and if the system flow is regulated by control valves. The system pressure may then be rebalanced under a PID control at the adaptive pressure set point which is understood to be the intersection or pressure equilibrium point of the adaptive linear or quadratic control curve and system curve.

For the flow rate regulated by circulators in which the system characteristics may be constant, however, Equation (3) may be used directly as long as the requested flow rate is provided accordingly, consistent with that disclosed in the aforementioned application Ser. No. 13/717,086, as well as U.S. provisional application Ser. No. 62/007,474.

To calculate the adaptive pressure set point by using Eqs. 1 or 3, the instant system curve $C_v(t)$ may need to be obtained first by using the flow equation. For that, the system pressure and flow rate at any instant time may need to be known, which may be realized by using a flow meter as well as a pressure sensor accordingly. In some hydronic systems, however, the system flow rate may not always be available due to the lack of a flow meter, a pressure sensor, or both. For that, the sensorless technique or means developed in the aforementioned U.S. application Ser. No. 14/091,795 and/or U.S. provisional application Ser. No. 61/976,749 may be utilized and adopted optimally here to estimate the system flow and pressure based upon motor operation variables, such as speed, torque, power or current ratings.

With this backdrop, in the instant application the adaptive linear pumping control is integrated together with the sensorless technique or means to provide an alternative way for the adaptive pumping control without the need for a flow meter and/or a pressure sensor. For example, FIG. 3 illustrates the pump and system hydronic characteristics relationship with respect to motor speed and power for a sensorless technique or means, where the pump differential pressure curve at a given speed and power is balanced to the system characteristics curve at an equilibrium point. To calculate the adaptive pressure set point by using Eqs. 1 together with 2, the instant system curve $C_v(t)$ may need to be obtained by using a sensorless converter technique or means first. There are several kinds of sensorless converters which have been developed, e.g., including that disclosed in U.S. application Ser. No. 14/091,795, U.S. application Ser. No. 14/187,817, and U.S. provisional application Ser. No. 61/976,749. One of approaches introduced here is the 3D discrete sensorless converter based upon 3 distribution functions of power, pump differential pressure and flow rate calibration data. The other one is the best fit affinity approach based upon the pump characteristics curve and its corresponding power curve only.

In the 3D discrete calibration conversion application, e.g., disclosed in U.S. application Ser. No. 14/091,795, the instant system curve $C_v$ may be obtained from the inversely remapped power function of $\hat{w}$ which is shown in FIG. 4 as $$C_v = \hat{w}(w, n), \quad (4)$$

where w represents the motor power and n is motor speed. In the inversion process for a pair of w and n readings given from the motor at an instant time, the corresponding system characteristics of $C_v$ at the time can be obtained inversely by resolving Eq. 4. The adaptive pressure set point can then be obtained by Eqs. 1 together with 2 accordingly.

The instant system curve $C_v$ may also be obtained by the best fit affinity conversion approach disclosed in U.S. provisional application Ser. No. 61/976,749 in form of $$C_v^{norm}(w, n) = -\frac{B}{2A} \pm \sqrt{\frac{w\left(\frac{n_{max}}{n}\right)^3 - \left(C - \frac{B^2}{4A}\right)}{A}}, \quad (5)$$

where A, B and C are the coefficients of the second order Best-fit Affinity motor power function with respect to the normalized system coefficient of $C_v^{norm}$ respectively.

Following this approach, the sensorless adaptive pump control technique or means can be developed without the need for a flow meter and/or a pressure sensor.

As a person skilled in the art would appreciate and understand, the pair of $C_v$ and $C_v$ readings given from the motor, e.g., may be sensed by suitable sensors, and provided in associated sensed signaling to the signal processor or signal processor module 10a (FIG. 5).

Self-Calibration

If the instant hydronics system characteristics of $C_v$ from Eqs. 4 or 5, instead of the instant system pressure and flow rate, is used directly to calculate the adaptive pressure set point by Eq. 1 together with Eq. 2, then the measured data that may need to be recalibrated in 3D sensorless models is therefore the power distribution of $C_v$ or $C_v$ in Eq. 4 or 5 with respect to the motor speed of $C_v$ as well as the hydronics system characteristics values of $C_v$ only. For that, the system calibration may be performed in a self-calibration scheme, e.g., by the signal processor or signal processor module 10a (FIG. 4), without the need for a flow meter and/or a pressure sensor. The recalibrated power distribution measured data can be obtained automatically by measuring the power readings while varying the motor speed and control valve signal incrementally which kept the same incremental steps and values as the original ones.

In the self-calibration configuration set forth above, the equivalent system characteristics incremental values associated with a pump are preserved. The assumption made here is that the pump hydronic pressure and flow rate should not change significantly due to aging or wearing but the power efficiency which is associated with the power conversion from the electrical power to mechanical and hydronic ones. By following this procedure, the self-calibration sensorless adaptive pump control can be realized automatically without the need for a flow meter and a pressure sensor.

The self-calibration technique or means by recalibrating the power distribution with respect to pump speed as well as the equivalent system characteristics associated with a pump may be used for a closed loop system in which the energy consumed by the system is due to the contribution of system dynamic friction loss only. For an open loop system with a static suction pressure, the self-calibration technique or means with a static suction pressure, the self-calibration technique or means may still be adopted with the power contribution due to the suction pressure calibrated out.

FIG. 5

By way of example, FIG. 5 shows apparatus 10 according to some embodiments of the present invention, e.g., featuring a signal processor or processing module 10a configured at least to:
receive signaling containing information about an adaptive or self-calibrating set point control curve and a varying equivalent system characteristic curve based at least partly on an instant pump pressure and a flow rate using an adaptive moving average filter, and equivalent hydronic system characteristics associated with the instant pump pressure and the flow rate to corresponding motor power and speed reconstructed and remapped using a discrete numerical approach; and
determine an adaptive pressure set point, based at least partly on the signaling received.

Figure 1B:
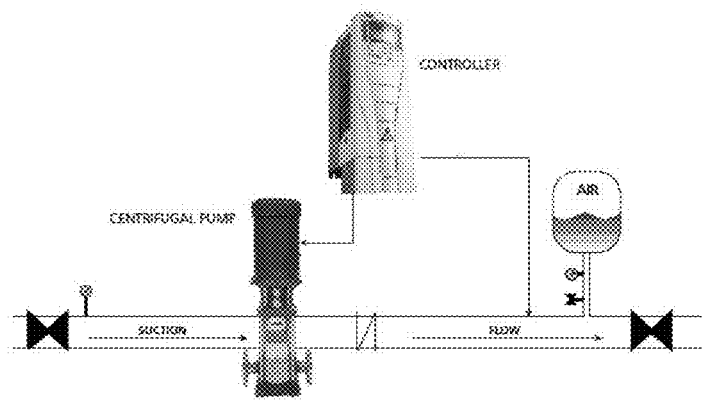

By way of example, the signal processor or processing module 10a may form part of a pump controller configured with, or as part of, a sensorless adaptive pump control with self-calibration apparatus for implementing in a hydronic pumping system, e.g., like that shown in FIG. 1.

By way of example, the functionality of the apparatus 10 may be implemented using hardware, software, firmware, or a combination thereof. In a typical software implementation, the apparatus 10 would include one or more microprocessor-based architectures having, e. g., at least one signal processor or microprocessor like element 10a. A person skilled in the art would be able to program such a microcontroller-based, or microprocessor-based, implementation to perform the functionality described herein without undue experimentation. For example, the signal processor or processing module 10a may be configured, e.g., by a person skilled in the art without undue experimentation, to receive signaling containing information about an adaptive or self-calibrating set point control curve and a varying equivalent system characteristic curve based at least partly on an instant pump pressure and a flow rate using an adaptive moving average filter, and equivalent hydronic system characteristics associated with the instant pump pressure and the flow rate to corresponding motor power and speed reconstructed and remapped using a discrete numerical approach, consistent with that disclosed herein.

Moreover, the signal processor or processing module 10a may be configured, e.g., by a person skilled in the art without undue experimentation, to determine an adaptive pressure set point, based at least partly on the signaling received, consistent with that disclosed herein.

The scope of the invention is not intended to be limited to any particular implementation using technology either now known or later developed in the future. The scope of the invention is intended to include implementing the functionality of the processors 10a as stand-alone processor or processor module, as separate processor or processor modules, as well as some combination thereof.

The apparatus 10 may also include, e.g., other signal processor circuits or components 10b, including random access memory (RAM) and/or read only memory (ROM), input/output devices and control, and data and address buses connecting the same, and/or at least one input processor and at least one output processor.

Alternative Embodiments Envisioned

The present invention may include one or more of the following:

According to some embodiments, the present invention of the sensorless adaptive pump control technique or means for a dynamic hydronic pumping system may include, or take the form of, an adaptive pumping control technique or means integrated with a sensorless technique or means. The adaptive pump control may be a technique or means to save pumping operation energy by adjusting the adaptive pressure set point automatically based upon the requested system flow rate which is obtained from the equivalent hydronic system characteristics and the adaptive control curve. The sensorless convertor based upon pump motor operation readings may provide the system pressure and flow rate, e.g., to obtain the instant equivalent hydronic system characteristics for the adaptive pump control technique or means.

According to some embodiments, the present invention regarding the sensorless adaptive pump control technique or means for a dynamic hydronic pumping system may include, or take the form of, an adaptive pumping control technique or means providing an adaptive pressure set point by the aforementioned Eq. (1) or (3) based upon the requested system flow rate by the aforementioned Eq. 2 provided in the aforementioned U.S. application Ser. No. 14/091,795, and application Ser. No. 13/717,086, and a sensorless technique or means by Eqs. (4) and (5), or Eq. (6) provided in Ser. No. 14/091,795, to obtain the instant equivalent hydronic system characteristics for the adaptive pump control technique or means.

According to some embodiments, the present invention regarding the sensorless adaptive pump control technique or means for a dynamic hydronic pumping system may include, or take the form of, one or more of the following implementations:
an adaptive pumping control means providing an adaptive pressure set point by the aforementioned equation (3) directly as long as a requested flow rate is provided accordingly, for instance, for a hydronic system in which the flow rate regulated by circulators.
a self-calibration scheme and means which may recalibrate the sensorless adaptive pumping control system automatically without a need for a flow meter and/or a pressure sensor. In the self-calibration configuration provided here, the measured calibration data that may need to be recalibrated is the power distribution with respect to the motor speed of n as well as the hydronics system characteristics only. Following this approach, a self-calibration sensorless adaptive pump control can be realized automatically without the need for a flow meter and a pressure sensor.

a technique for processing the pump differential pressure and flow rate data since all energy consumed by the system is from the contribution of system dynamic friction loss which is relevant to pump differential pressure only. The calibration data may include the system pressure data or pump discharge section pressure and the corresponding flow rate as well.

any close-loop hydronic systems or any open loop hydronic systems, such as primary pumping systems, secondary pumping systems, water circulating systems, and pressure booster systems. The systems mentioned here may consist of a single zone or multiple zones.

an open loop system with a static suction pressure in which the system pressure data and flow rate calibrated directly in field may be a preferred solution. For an open loop system with a varying suction pressure, however, one pressure sensor at the pump suction side or a differential pressure sensor at pump together with the pump and motor calibration data may be used to calculate the pressure and flow rate contributions due to the suction pressure for a pump control application.

Moreover, according to some embodiments, the present invention regarding motor readings input signals for the sensorless adaptive pump control technique or means for a dynamic hydronic pumping system may include, or take the form of, a technique for processing potential motor electrical or mechanical parameters such as motor speed, current rating, torque, power, temperature, and any of those combinations.

According to some embodiments, the present invention regarding hydronic primary control signals for the sensorless adaptive pump control technique or means for a dynamic hydronic pumping system may include, or take the form of, a technique for processing system pressure, differential pressure, zone pressures, system flow rates or zone flow rates.

According to some embodiments, the present invention regarding control and signals generating and monitoring transmitting and wiring technologies may be implemented in any conventional sensing and transmitting means that is used currently. Preferably, wireless sensor signals transmission technologies may provide for optimal and favorable solutions.

According to some embodiments, the present invention regarding pumps mentioned here for hydronic pumping systems may include, or be implemented in a single pump, a circulator, a group of parallel ganged pumps or circulators, a group of serial ganged pumps or circulators, or their combinations.

According to some embodiments, the present invention regarding systems flow regulation may include, or be implemented in relation to, manual or automatic control valves, manual or automatic control circulators, or their combinations.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. Apparatus comprising:
   a signal processor or processing module configured at least to:
   receive signaling containing information about an adaptive or self-calibrating set point control curve and a varying equivalent system characteristic curve based at least partly on an instant pump pressure and a flow rate using an adaptive moving average filter, and associated signaling containing information about an equilibrium point of pump differential pressure and system pressure formulated in a hydronic domain by utilizing pump and system characteristic curve equations so as to yield system pressure and flow at any particular load and time in a pump hydronic system,
   determine equivalent hydronic system characteristics associated with the instant pump pressure and the flow rate to corresponding motor power and speed reconstructed and remapped using a discrete numerical approach; and
   determine corresponding signaling containing information about an adaptive pressure set point, based at least partly on the signaling and associated received.

2. Apparatus according to claim 1, wherein the signal processor or processing module is configured to provide the corresponding signaling containing information about the adaptive pressure set point, including a system pumping flow rate and pressure.

3. Apparatus according to claim 2, wherein the corresponding signaling contains information used to control a pumping hydronic system.

4. Apparatus according to claim 1, wherein the signal processor or processing module is configured to:
   receive associated signaling containing information about the instant pressure and the flow rate of fluid being pumped in a pumping system; and
   determine the adaptive or self-calibrating set point control curve and the varying equivalent system characteristic curve, based at least partly on the associated signaling received.

5. Apparatus according to claim 1, wherein the signal processor or processing module comprises: at least one processor and at least one memory including computer program code, and the at least one memory and computer program code are configured to, with at least one processor, to cause the signal processor or processing module at least to receive the signaling and determine the adaptive pressure set point.

6. A method comprising:
   receiving in a signal processor or processing module signaling containing information about an adaptive or self-calibrating set point control curve and a varying equivalent system characteristic curve based at least partly on an instant pump pressure and a flow rate using an adaptive moving average filter, and associated signaling containing information about an equilibrium point of pump differential pressure and system pressure formulated in a hydronic domain by utilizing pump and system characteristic curve equations so as to yield system pressure and flow at any particular load and time in a pump hydronic system, and determining equivalent hydronic system characteristics associated with the instant pump pressure and the flow rate to corresponding motor power and speed reconstructed and remapped using a discrete numerical approach; and determining in the signal processor or processing module corresponding signaling containing information about an adaptive pressure set point, based at least partly on the signaling and the associated received.

7. A method according to claim 6, wherein the method comprises providing from the signal processor or processing module corresponding signaling containing information about the adaptive pressure set point determined, including a system pumping flow rate and pressure.

8. A method according to claim 7, wherein the corresponding signaling contains information used to control the pumping hydronic system.

9. A method according to claim 6, wherein the method comprises configuring the signal processor or processing module to:

receive associated signaling containing information about the instant pressure and the flow rate of fluid being pumped in a pumping system; and determine the adaptive or self-calibrating set point control curve and the varying equivalent system characteristic curve, based at least partly on the associated signaling received.

10. A method according to claim 6, wherein the method comprises configuring the signal processor or processing module with at least one processor and at least one memory including computer program code, and the at least one memory and computer program code are configured to, with at least one processor, to cause the signal processor or processing module at least to receive the signaling and determine the adaptive pressure set point.

* * * * *